Patented Aug. 16, 1949

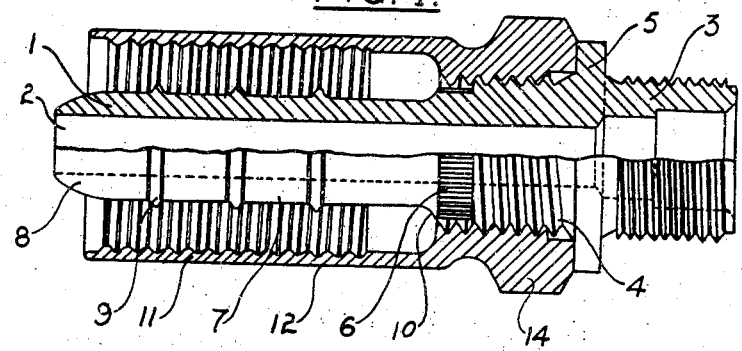
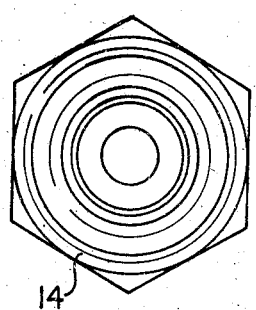
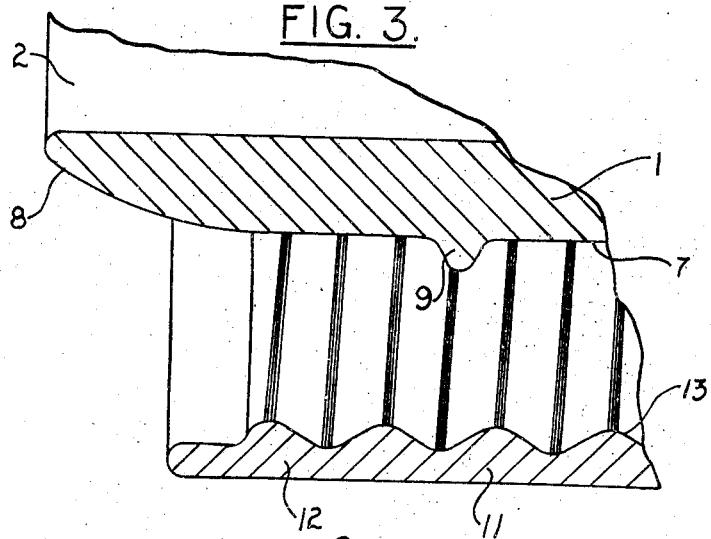

2,479,499

UNITED STATES PATENT OFFICE 2,479,499

COUPLING FOR RUBBER, FABRIC, AND LIKE HOSES

Camille Clare Sprankling Le Clair, Acton, London, England, assignor to Tecalemit Limited, Brentford, England, a corporation of Great Britain Application December 8, 1945, Serial No. 633,603
In Great Britain January 1, 1945

2 Claims. (Cl. 285—84)

This invention relates to couplings, adapters or like devices (hereinafter called "couplings") of the kind which comprises a ferrule at one end, adapted to be attached to a hose of rubber, fabric or other flexible and relatively compressible material, and means, such as a screwed shank, whereby the coupling may be attached to another coupling, adapter or other device or apparatus.

Many methods of attaching such hoses to couplings are known, such, for example, as that in which the hose is first passed as a fairly tight sliding fit over a tubular ferrule and is then clipped to the ferrule by one or more circumferential clips tightened by tangent screws. Such means, however, are objectionable, in that the tightening screws are clumsy and essentially asymmetrically disposed so that they constitute projections from the circular form of the coupling which may be a danger to the users' hands. Further, such clips are liable to break and to be lost.

The object of this invention, therefore, is to provide improved couplings and improved methods for attaching couplings to hoses.

According to the present invention, a hose coupling is characterised by the feature that it is made in at least two parts, one of which consists of an outer ferrule and the other of an inner ferrule (which forms the fluid flow conduit) which are so disposed in the completed coupling as to provide between them and over part of their length an annular recess in which the end of the hose is fitted, both ferrules being formed with a groove, recess or indentation or with a number of spaced grooves, recesses or indentations into which the material of the hose can be forced in order that the hose shall be firmly gripped in the coupling. As an alternative, however, both ferrules may be formed with a number of spaced protuberances adapted to be forced into the material of the hose.

The two ferrules are made separately and are assembled to form the coupling cooperating means being provided on or in the ferrules whereby the inner ferrule can not only be fixed firmly within the outer ferrule, but after assembly can also be locked in position.

The outer ferrule may, for example, comprise a sleeve part integral with an end part which is screwed internally to receive an externally threaded intermediate part of the inner ferrule, these two parts providing the inner closed end of the said annular recess which is formed between the outer and inner ferrules. A portion of the inner ferrule within the outer ferrule may also be formed externally with serrations or indentations into which the metal of the outer ferrule may be forced after the ferrules have been assembled so as to lock the ferrules together. The walls of the ferrules bounding the said recess may be formed with spaced longitudinal, or circular projections, or with continuous or interrupted helical projections, or with projections of other forms adapted to be forced into the hose material when the outer ferrule is pressed inwards towards the inner ferrule. On the other hand, both ferrules may be provided with a number of similar grooves, recesses or indentations.

One constructional form of the invention is shown, by way of example, on the accompanying sheet of drawings, whereon—

Fig. 1 is a longitudinal section of the hose coupling;

Fig. 2 is an end view of the coupling; and

Fig. 3 is a fragmentary sectional view to an enlarged scale of the coupling showing the protruding ridges or rings on the inner ferrule and outer ferrules.

Referring to the drawings:

The metal inner ferrule 1, which has an axial bore 2 providing the fluid flow conduit, is formed at one end with an externally screwed shank 3 whereby the coupling may be attached to a hose or to another device or apparatus (not shown). The inner ferrule 1 is also formed with an intermediate part 4 which is screwed externally and is separated from the shank by means of a circular shoulder 5. At the end of this intermediate part remote from the shoulder there is a short cylindrical portion 6 which is knurled externally and is of diameter equal to or slightly less than the bottom of the thread on the intermediate part 4. The remainder of the inner ferrule forms a spigot 7 which is of less diameter than the said knurled portion 6 and its tip 8 is rounded to facilitate the easy entry of the spigot into the hose. The spigot is also formed externally with a number of spaced circumferential rings or ridges 9 and the inner end of the spigot is radiused at 10 to meet the said knurled portion.

The metal outer ferrule 11 is hollow and over the greater part of its length it is formed as a relatively thin sleeve 12 which is spirally serrated internally at 13 and is integral with an end part 14 which is formed externally with flats so that it may act as a nut and receive a spanner. This end part is screw-threaded internally to receive the external thread on the intermediate part 4 of the inner ferrule and it is of such a length that when the ferrules are assembled, a part of the thread surrounds the knurled part 6 of the inner ferrule.

In assembling the two ferrules, the inner ferrule 1 is screwed into the outer ferrule 11 until the shoulder 5 on the inner ferrule abuts against the face of the nut portion 14 of the outer ferrule. When the ferrules are thus assembled, the tip 8 of the spigot part 7 of the inner ferrule projects slightly out of the sleeve part 12 of the outer ferrule. The end of the hose is engaged over the tip of the spigot part of the inner ferrule and is then pushed over the spigot part right home to the bottom of the annular space between the ferrules.

The sleeve part 12 of the outer ferrule is then swaged inwards, e. g., by means of split dies or a roller device. This swaging operation not only crushes the serrations in the sleeve part 12 of the outer ferrule into the material of the hose thereby also crushing the hose on to the rings or ridges 9 on the spigot part 7 of the inner ferrule, but it also crushes the tops of those threads in the threaded end part of the outer ferrule which surround the knurled part 6 of the inner ferrule into the serrations of the knurled part and thus provides a lock to prevent the two ferrules becoming unscrewed.

The separate circular rings or ridges 9 on the inner ferrule may, if desired, be replaced by one or more helical serrations and correspondingly the internal spiral protuberances in the sleeve part of the outer ferrule may be replaced by separate circular rings or ridges, like the rings or ridges 9.

In a modification the knurled part 6 of the inner ferrule may also be formed adjacent to the said shoulder 5, the metal of the outer ferrule then being swaged into the knurled part of the inner ferrule, if necessary by a separate swaging operation.

I claim:

1. A hose coupling comprising, in combination, a hollow outer ferrule having a relatively thin sleeve portion and an internally threaded integral end portion, a hollow inner ferrule which serves as a fluid flow conduit and includes a spigot part, an integral intermediate part externally threaded to fit said internally threaded portion of the outer ferrule and an integral shank part adapted to use as a connecting element, said outer and inner ferrules being proportioned for assembly in co-axial relationship with the spigot part of said inner ferrule within and radially spaced from the sleeve portion of said outer ferrule and with said threaded part and threaded portion screwed together, said inner ferrule having a generally axially serrated portion adjacent the inner end of the externally threaded part thereof, and said internally threaded portion of the outer ferrule overlying and being reduced in section at a position adjacent said serrated portion when the ferrules are screwed together, so that externally effected and inward radial deformation of the outer ferrule adjacent the position of said serrated portion forces some threads of the outer ferrule into engagement with the serrations to lock the two ferrules in their assembled positions.

2. A hose coupling comprising, in combination, a hollow outer ferrule having a relatively thin sleeve portion and an internally threaded integral end portion, a hollow inner ferrule which serves as a fluid flow conduit and includes a spigot part, an integral intermediate part externally threaded to fit said internally threaded portion of the outer ferrule and an integral shank part adapted to use as a connecting element, said outer and inner ferrules being proportioned for assembly in co-axial relationship with the spigot part of said inner ferrule within and radially spaced from the sleeve portion of said outer ferrule and with said threaded part and threaded portion screwed together, the inner surface of said sleeve portion of the outer ferrule and the outer surface of said spigot part of the inner ferrule each having at least one recessed portion therein into which hose material is forced by radial pressure when assembled therebetween, one of said ferrules having a generally axially serrated portion in position to face a part of the threads of the other when the ferrules are screwed together, so that externally effected inward deformation of one ferrule toward the other effects engagement of the threads and axial serrations to lock the ferrules in their assembled relationship.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 1,403,309 | Follous | Jan. 10, 1922 |
| 2,029,846 | Henke | Feb. 4, 1936 |
| 2,146,756 | Miller | Feb. 14, 1939 |
| 2,171,945 | Norgen | Sept. 5, 1939 |